(12) United States Patent
Cress et al.

(10) Patent No.: US 7,802,758 B2
(45) Date of Patent: Sep. 28, 2010

(54) LOAD-DISTRIBUTING ROTOR INSERT FOR AIRCRAFT BRAKES

(75) Inventors: James Jay Cress, Mishawaka, IN (US); Charles F. Sarver, Bremen, IN (US)

(73) Assignee: Honeywell International Inc., Morris Township, NJ (US)

( * ) Notice: Subject to any disclaimer, the term of this patent is extended or adjusted under 35 U.S.C. 154(b) by 476 days.

(21) Appl. No.: 11/797,608

(22) Filed: May 4, 2007

(65) Prior Publication Data

US 2008/0272235 A1  Nov. 6, 2008

(51) Int. Cl.
   B64C 25/46  (2006.01)
   F16D 65/06  (2006.01)

(52) U.S. Cl. .................... 244/103 R; 244/111; 188/73.2

(58) Field of Classification Search ............. 244/102 R, 244/103 R, 100 R, 111; 188/73.1, 73.2, 218 XL, 188/71.5
   See application file for complete search history.

(56) References Cited

U.S. PATENT DOCUMENTS

| 3,550,740 | A |   | 12/1970 | LeBlanc et al. |
| 3,670,858 | A |   | 6/1972  | Van Horn |
| 3,757,907 | A | * | 9/1973  | Crossman et al. ..... 188/218 XL |
| 3,907,076 | A |   | 9/1975  | Crossman et al. |
| 3,972,395 | A |   | 8/1976  | Jannasch et al. |
| 4,007,814 | A |   | 2/1977  | Berger |
| 4,155,432 | A |   | 5/1979  | Krause |
| 4,465,165 | A |   | 8/1984  | Bok |
| 4,511,021 | A |   | 4/1985  | Grider |
| 4,557,356 | A | * | 12/1985 | Petersen ............... 188/218 XL |
| 4,742,948 | A |   | 5/1988  | Fisher et al. |
| 4,747,473 | A |   | 5/1988  | Bok et al. |
| 4,784,246 | A |   | 11/1988 | Edmisten |
| 4,863,001 | A |   | 9/1989  | Edmisten |
| 4,890,700 | A | * | 1/1990  | Guichard .................. 188/73.2 |
| 5,143,184 | A |   | 9/1992  | Snyder et al. |
| 5,273,140 | A |   | 12/1993 | Berwanger |
| 5,560,452 | A |   | 10/1996 | Labougle |
| 6,139,215 | A |   | 10/2000 | Kuhne et al. |
| 6,635,355 | B2 |  | 10/2003 | Bianco et al. |
| 2007/0193836 | A1 | | 8/2007  | Walker et al. |

FOREIGN PATENT DOCUMENTS

| EP | 0161200       | 11/1985 |
| FR | 2719879       | 11/1995 |
| GB | 2139300       | 11/1984 |
| GB | 2201475       | 9/1988  |
| WO | WO-2005106279 | 11/2005 |

\* cited by examiner

*Primary Examiner*—Tien Dinh
(74) *Attorney, Agent, or Firm*—Birch, Stewart, Kolasch & Birch, LLP.

(57) ABSTRACT

An aircraft brake rotor includes a circular rotor disk (10) having first and second walls (12) and a peripheral wall (14) connecting the first and second walls (12), the peripheral wall (14) including at least one notch (16) having a bottom wall (18) and first and second side walls (20) extending away from the bottom wall (18), an insert (22, 50, 60) having a first portion (24, 62) mounted against the first side wall (20) and a retainer (30, 74) connected to the rotor disk (10) and having at least one projection (38, 82), a portion of the at least one insert (22, 50, 60) extending between the at least projection (38, 82) and the first side wall (20), thus limiting movement of the insert (22, 50, 60) in a direction perpendicular to the first side wall (20).

16 Claims, 5 Drawing Sheets

LOAD-DISTRIBUTING ROTOR INSERT FOR AIRCRAFT BRAKES

FIELD OF THE INVENTION

The present invention is directed toward a load distributing insert for aircraft brake rotors and, more specifically, toward a load distributing rotor insert for aircraft brake rotors having a lower mass than conventional rotor inserts.

BACKGROUND OF THE INVENTION

A known type of aircraft brake system comprises a plurality of stator disks mounted to a fixed portion of a wheel support and a plurality of rotor disks connected for rotation with an aircraft wheel which rotors extend into spaces between the stators. When braking is required, a piston mounted next to this stack of disks is extended to compress the stack and force the rotors and stators into contact, thus slowing the rotors and the wheel attached thereto.

Rotor drive keys are mounted on the interior of the aircraft wheel to engage the rotors and cause the rotors to rotate with the wheel. These drive keys are essentially metal bars that run parallel to the axis of the wheel and perpendicular to the major faces of the rotor disks. Each rotor disk includes a plurality of notches along its outer periphery through which the drive keys extend, and this notch-and-key arrangement circumferentially couples the rotors to the wheel.

Brake rotors and stators are sometimes formed from steel. However, it is becoming common to form the rotor and stator disks from carbon materials. These materials may comprise, for example, carbon embedded in a carbon fiber matrix, which material may be referred to generically as "carbon" or "carbon-carbon." Carbon rotors also include notches in their peripheral walls for accommodating drive keys. However, because carbon can be more fragile than steel, these notches also typically include inserts to better distribute the load from the drive keys to the rotor disk and to reduce wear on the carbon disks. These inserts are typically formed from steel and are thus heavier than a similarly sized body of carbon material.

A conventional rotor and rotor insert are illustrated in FIG. 11 which shows a rotor 200 having first and second sides 202, only one of which is visible in FIG. 11, and a peripheral wall 204 connecting the sides 202. A notch 206 extends into peripheral wall 204 for receiving a drive key (not shown). The notch has a bottom wall 208 and first and second side walls 210 extending away from bottom wall 208. A rotor insert 212 is mounted in notch 206 and includes a bottom 214 overlying notch bottom wall 208 and first and second legs 216 extending from insert bottom 214 along notch first and second side walls 210. A retainer 218 overlies peripheral wall 204 and projects over the ends and sides of insert legs 216 to secure insert 212 against axial and radial movement with respect to the rotor disk. Rivets 220 secure the retainer 218 to the rotor 200. In use, a drive key (not shown) running through notch 206 will contact insert legs 216 which in turn distribute the load from the drive key over the side walls 210 of the notch 206.

Rotor inserts such as the above perform in an acceptable manner. However, such inserts are generally formed from steel and add to the weight of a brake assembly. Eliminating the inserts on a carbon rotor is generally not an acceptable option because the drive keys are likely, eventually, to damage the notch in the carbon rotor. However, it would be desirable to provide an insert that performs functions similar to those of existing inserts but which has a reduced mass so as to reduce the overall weight of a brake assembly.

SUMMARY OF THE INVENTION

These problems and others are addressed by embodiments of the present invention, a first aspect of which comprises an aircraft brake rotor having a circular rotor disk with first and second walls and a peripheral wall connecting the first and second walls. The peripheral wall includes at least one notch having a bottom wall and first and second side walls extending away from the bottom wall. An insert having a first portion mounted against the first side wall is provided in the notch, and a retainer is connected to the rotor disk. The retainer has at least one projection, and a portion of the at least one insert extends between the at least projection and the first side wall, thereby limiting movement of the at least one insert in a direction perpendicular to the first side wall.

Another aspect of the invention comprises an aircraft brake rotor with a circular rotor disk having first and second sides and a peripheral wall connecting the first and second sides. The peripheral wall includes at least one notch having a bottom wall and first and second side walls that extend away from the bottom wall. Load distributing means are mounted against the first side wall and against the second side wall, and retainer means are connected to the rotor disk for retaining the load distributing means against the first side wall. A portion of the load distributing means extends between the retainer means and the first side wall.

A further aspect of the invention comprises an aircraft brake rotor with a circular rotor disk having first and second sides and a peripheral wall connecting the first and second sides. The peripheral wall includes a first notch and a second notch circumferentially spaced from the first notch, and each of the first and second notches have first and second side walls extending away from the bottom wall. First and second inserts are provided in the first notch that overlie the first notch first and second side walls, and third and fourth inserts are provided in the second notch that overlie the second notch first and second side walls. A retainer is connected to the rotor around a portion of the peripheral wall and has a first U-shaped end portion near the first notch and a second U-shaped end portion near the second notch. First and second projections at the first U-shaped end portion project into the first notch, and third and fourth projections at the second U-shaped end portion project into the second notch. A portion of the first insert extends between the first projection and the first notch first wall and a portion of the third insert extends between the third projection and a portion of the second notch second wall, and this limits movement of the first insert in a direction perpendicular to the first notch first side wall and limits movement of the third insert in a direction perpendicular to the second notch second side wall.

BRIEF DESCRIPTION OF THE DRAWINGS

These aspects and features of the invention and others will be better understood after a reading of the following detailed description together with the attached drawings wherein.

DETAILED DESCRIPTION

Figure 1:
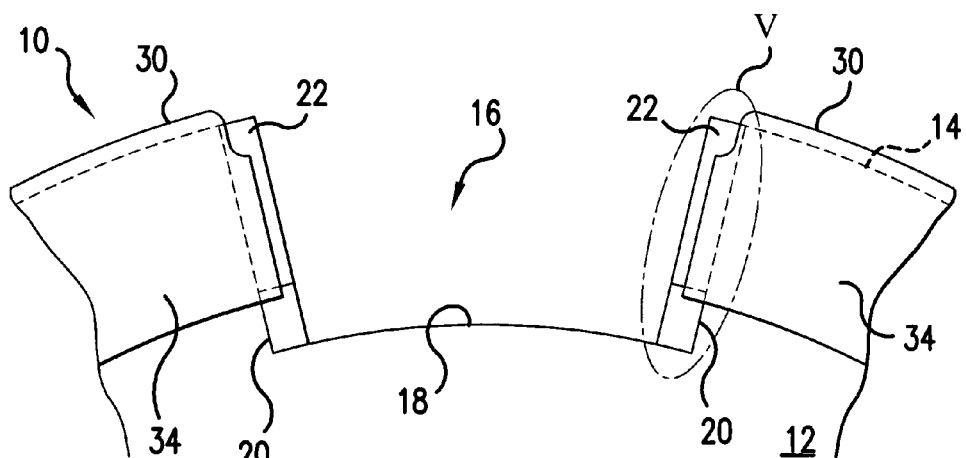
FIG. 1 is a side elevational view of a portion of a brake rotor having a rotor insert and a retainer according to an embodiment of the present invention.
Figure 2:
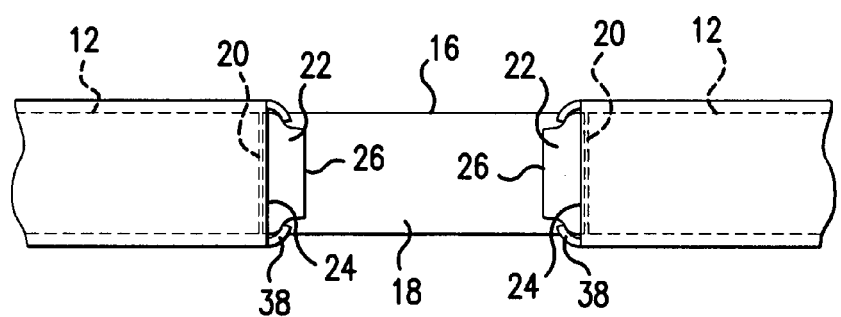
FIG. 2 is a top plan view of the brake rotor portion of FIG. 1.

Referring now to the drawings, wherein the showings are for purposes of illustrating embodiments of the invention only and not for the purpose of limiting same, FIGS. 1 and 2 illustrate a rotor 10 having first and second sides 12 and a peripheral wall 14 having a plurality of notches 16. The notches 16 include a bottom wall 18 and first and second side walls 20 extending away from bottom wall 18.

Figure 3:
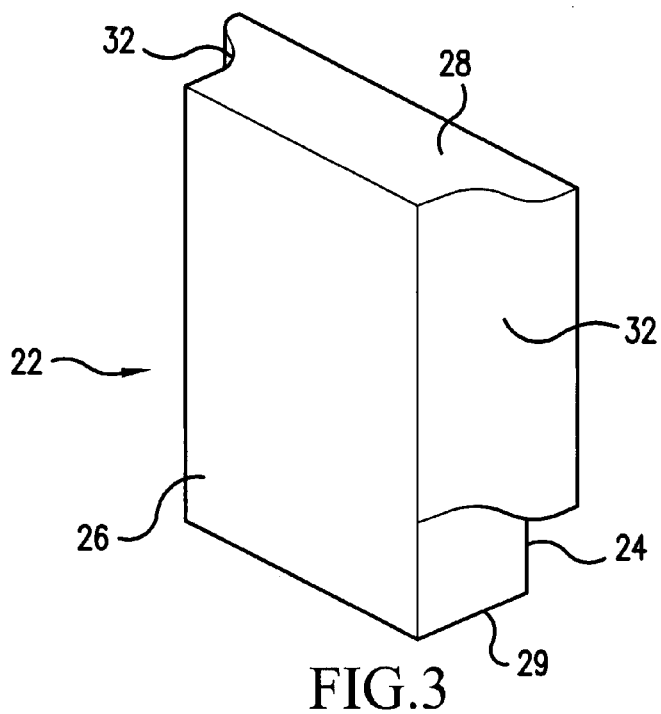
FIG. 3 is a perspective view of one of the rotor inserts of FIG. 1.
Figure 4:
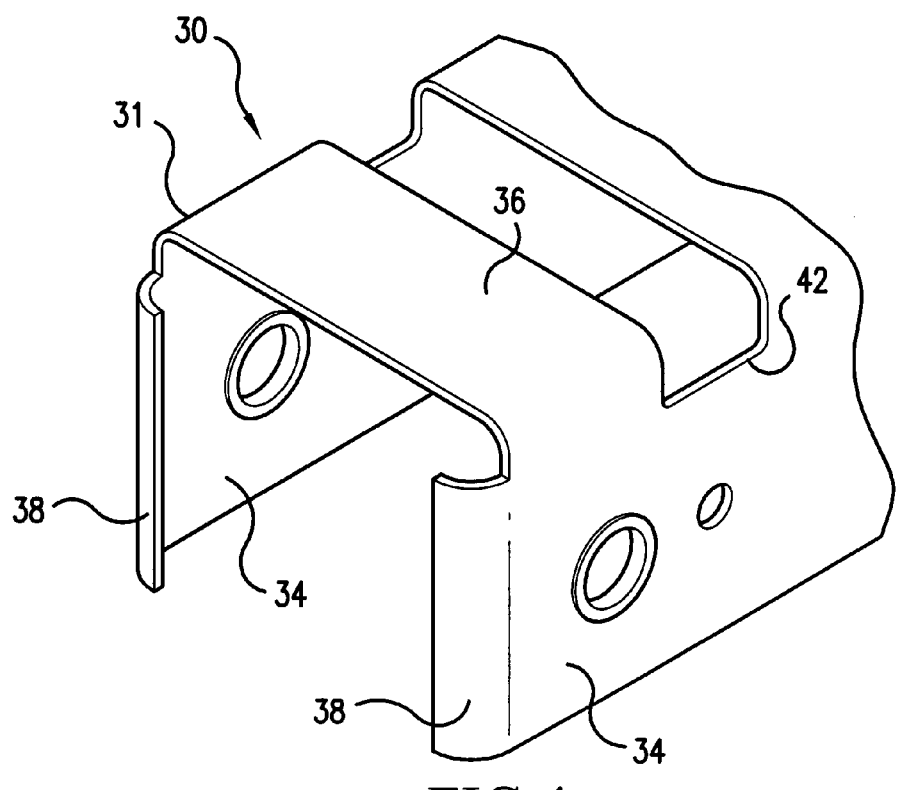
FIG. 4 is a perspective view of one end of the retainer of FIG. 1.
Figure 5:
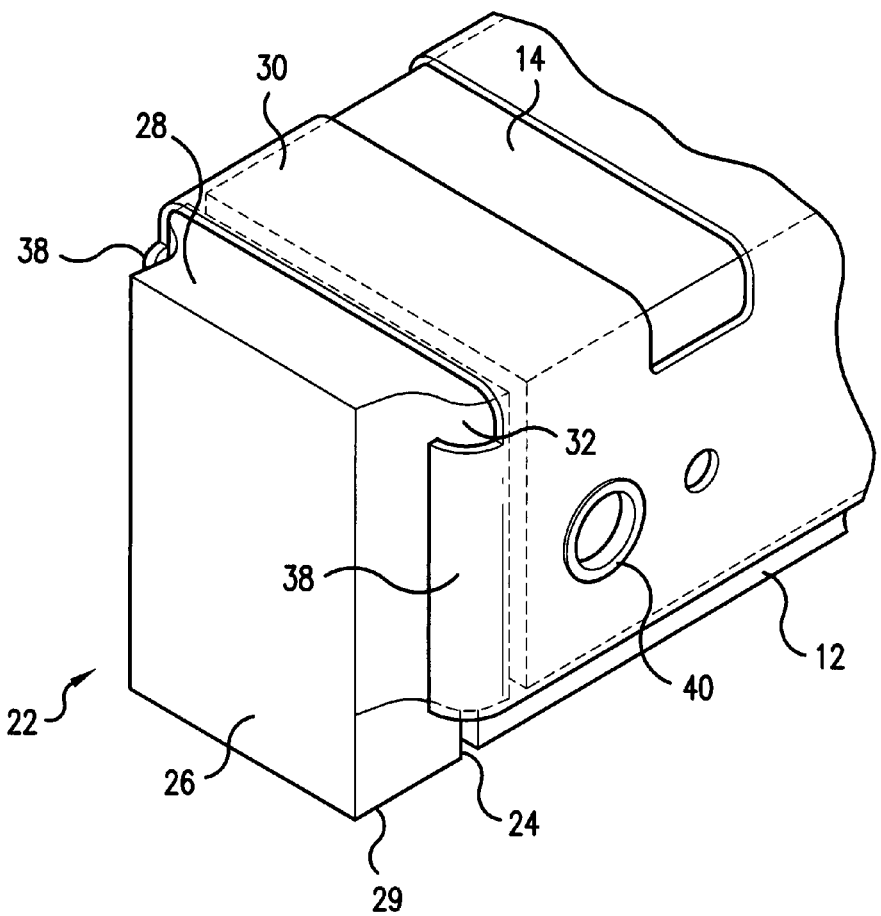
FIG. 5 is a perspective view of detail V in FIG. 1.
Figure 6:
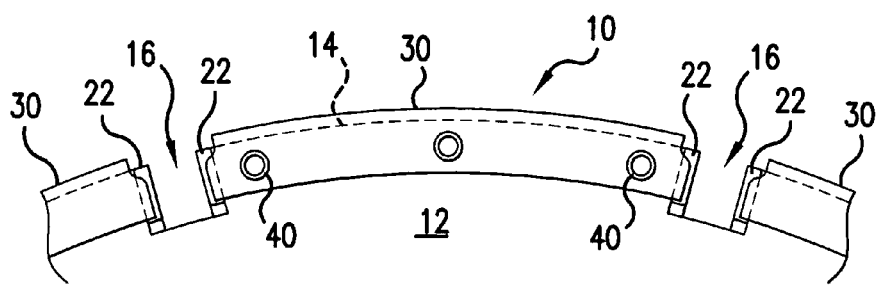
FIG. 6 is a side elevational view of the brake rotor of FIG. 1 illustrating two adjacent notches in the rotor.

A rotor insert 22 is illustrated in FIG. 3 and includes a first portion 24 and a second portion 26 spaced from the first portion. Insert 22 also includes a top 28 and a bottom 29 and a curved side portion 32 connecting the first portion 24 and second portion 26 and extending at least part of the distance between top 28 and bottom 29. Inserts 22 are illustrated in notches 16 in FIGS. 1 and 2 wherein it can be seen that bottom 29 of the insert 22 contacts bottom wall 18 of notch 16 and first portion 24 of the insert 22 contacts one of the side walls 20 of the notch while second portion 26 of the insert 22 faces into notch 16. In the present embodiment, the width of first portion 24 is approximately equal to the width of the rotor 10 while the width of the second portion 26 is less than the rotor width. Inserts 22 are preferably formed from steel, and it will be appreciated that first and second insert 22 comprise less steel and will have a lower mass than the mass of the conventional insert illustrated in FIG. 10.

Retainers 30 are connected along peripheral wall 14 of rotor 10 and include first and second U-shaped end portions 31 with first and second legs 34 of the U overlying the first and second sides 12 of the rotor and a central portion 36 overlying peripheral wall 14. First and second projections 38 extend from the legs 34 of the retainer 30 past first portion 24 of each insert 22 and engage curved side portions 32 to hold the inserts 22 against the side walls 20 of the notches 16. The length of retainers 30 is selected to be slightly greater than the distance between two adjacent notches 16 so that the central portions 36 of the retainers overlie the tops 28 of the inserts 22 and limit movement of the inserts in a radial direction out of slots 16. Fasteners 40 secure the retainers to the rotor 10. Openings 42 may be formed in retainer 30 between the first and second U-shaped end portions 31 to reduce the weight of the retainer. A drive key (not illustrated) extending through notch 16 will engage second portion 26 of the insert 22 away from the projections 38.

Figure 10:
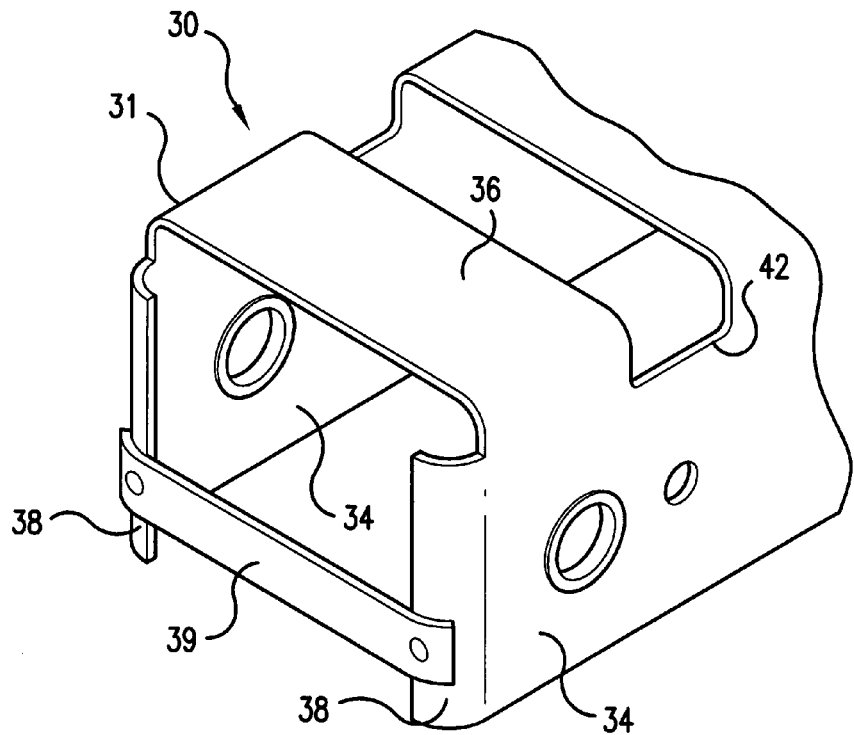
FIG. 10 is a perspective view of a modified version of the end of the retainer shown in FIG. 4.
Figure 11:
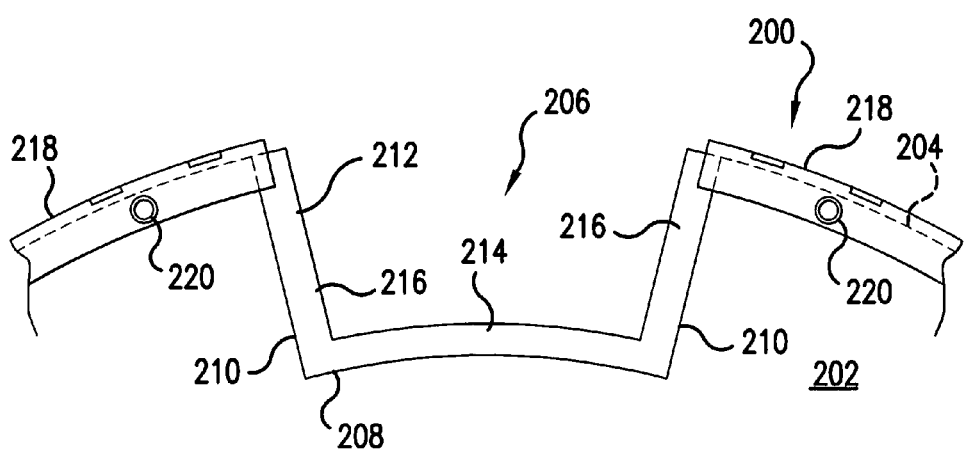
FIG. 11 is a side elevational view of a conventional rotor and rotor insert.

FIG. 10 illustrates an optional modification to the retainers 30 comprising a reinforcing band 39 welded or otherwise attached between projections 38 to provide additional strength for the retainers.

Figure 7:
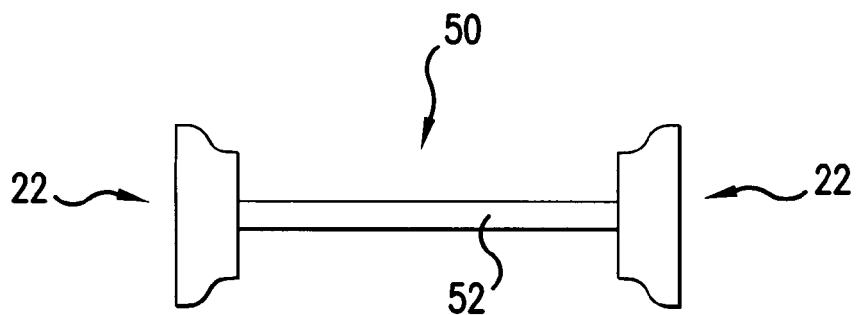
FIG. 7 is a top plan view of a rotor insert according to a second embodiment of the present invention.
Figure 8:
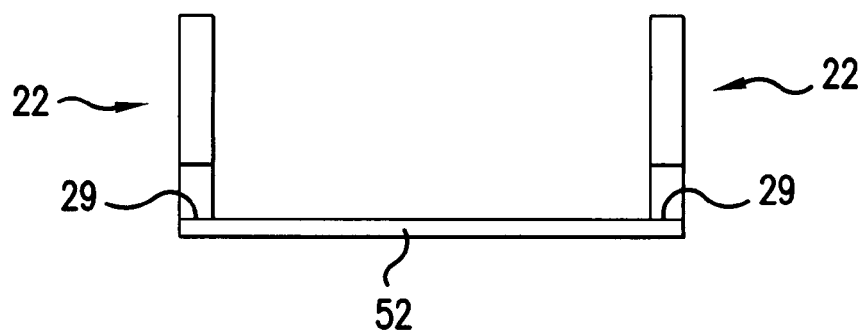
FIG. 8 is a side elevational view of the insert of FIG. 7.

An insert according to a second embodiment of the present invention is illustrated in FIGS. 7 and 8. Insert 50 comprises a pair of inserts 22 joined by a band 52 at bottoms 29. The various portions of inserts 22 are identified by the same reference numerals used in the first embodiment. Band 52 is substantially lighter than the central portion of a conventional insert, and insert 50 is therefore lighter than a conventional insert. Joining two inserts 22 in this manner, however, may help hold the inserts 50 in place and in a proper orientation while retainers 30 are attached to a rotor.

Figure 9:
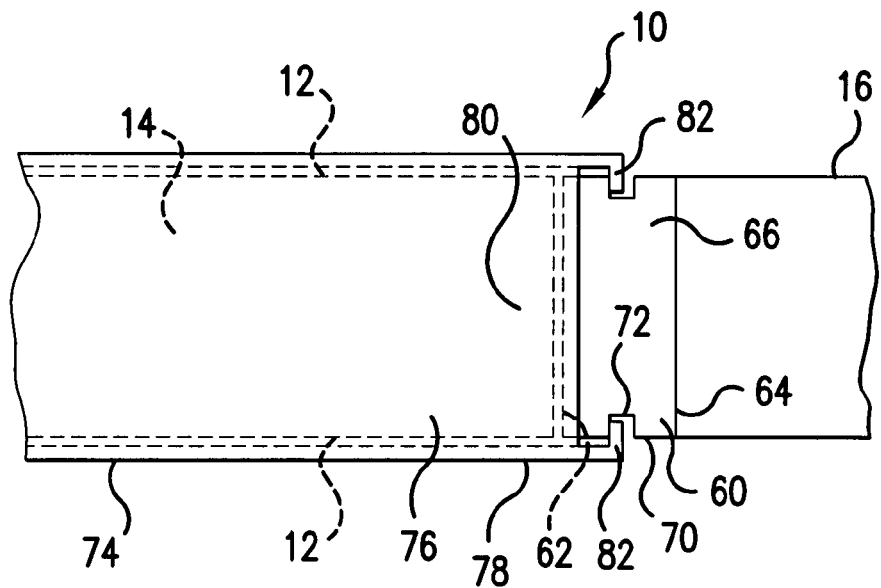
FIG. 9 is a top plan view of a rotor insert according to a third embodiment of the present invention.

An insert and retainer according to a third embodiment of the present invention are illustrated in FIG. 9. In this embodiment, insert 60 comprises a first portion 62 and a second portion 64 spaced from the first portion 62. Insert 60 also includes a top 66 and a bottom (not illustrated) and side portion 70 connecting the first portion 62 and second portion 64 and having a groove 72 extending between top 66 and the bottom. A retainer 74 overlies the peripheral wall 14 of rotor 10 and also overlies a portion of insert top 66 to retain insert 60 radially in notch 16. Retainer 74 includes a U-shaped end portion 76 having legs 78 overlying side walls 12 of rotor 10 and a central portion 80 overlying peripheral wall 14. First and second projections 82 extend from legs 78 into grooves 72 and secure insert 60 in notch 16 against movement in the direction of the rotor axis.

The present invention has been described herein in terms of several embodiments. Modifications of and additions to these embodiments will become apparent to those of ordinary skill in the art upon a reading of the foregoing description. It is intended that all obvious modifications and additions comprises a part of the present invention to the extent they fall within the scope of the several claims appended hereto.

What is claimed is:

1. An aircraft brake rotor comprising:
    a circular rotor disk having first and second walls and a peripheral wall connecting said first and second walls, said peripheral wall including at least one notch having a bottom wall and first and second side walls extending away from said bottom wall;
    at least one insert having a first portion mounted against said first side wall; and
    a retainer connected to said rotor disk and having a plurality of projections projecting into said at least one notch, a portion of said at least one insert extending between said plurality of projections and said first side wall, thereby limiting movement of said at least one insert in a direction perpendicular to said first side wall, wherein said at least one notch comprises a first notch and a second notch and said retainer includes a first end at said first notch and a second end at said second notch, and
    said retainer comprises at least one U-shaped end portion, said at least one U-shaped end portion comprising first and second legs and a central portion connecting said first and second legs, wherein a first one of said plurality of projections projects from said first leg and a second one of said plurality of projections projects from said second leg.

2. The aircraft brake rotor of claim 1 wherein said plurality of projections comprises first and second projections.

3. The aircraft brake rotor of claim 2 including a reinforcing strap connected between said first and second projections.

4. The aircraft brake rotor of claim 1 wherein said at least one insert has a second portion spaced from said first portion, said second portion having a width less than a width of said first portion.

5. The aircraft brake rotor of claim 4 wherein said second portion width is less than a thickness of said rotor disk.

6. The aircraft brake rotor of claim 1 wherein said at least one insert includes a first insert overlying said first side wall and a second insert overlying said second side wall, said first insert being joined to said second insert.

7. The aircraft brake rotor of claim 1 wherein said at least one insert comprises first and second inserts, overlying said first side wall and said second side wall, respectively, and being separate inserts.

8. The aircraft brake rotor of claim 1 wherein said at least one U-shaped end portion comprises first and second U-shaped end portions, a first one of said plurality of projections extending into said first notch and a second one of said plurality of projections extending into said second notch.

9. The aircraft brake rotor of claim 8 including a plurality of fasteners fastening said retainer to said rotor brake disk.

10. An aircraft brake rotor comprising:
a circular rotor disk having first and second sides and a peripheral wall connecting said first and second sides, said peripheral wall including at least one notch having a bottom wall and first and second side walls extending away from said bottom wall;
load distributing means mounted against said first side wall and against said second side wall; and
retainer means connected to said rotor disk for retaining said load distributing means against said first side wall, said retainer means having projection means projecting into said at least one notch, wherein
a portion of said load distributing means extends between said projection means and said first side wall,
said at least one notch comprises a first notch and a second notch and said retainer means includes a first end at said first notch and a second end at said second notch, and
said retainer means comprises first and second U-shaped end portions, a first one of said projection means extending into said first notch and a second one of said projection means extending into said second notch.

11. The aircraft brake rotor of claim 10 wherein said load distributing means includes a first load distributing member overlying said first side wall and joined to a second load distributing member overlying said second side wall and said retainer means overlies said peripheral wall.

12. The aircraft brake rotor of claim 10 wherein said load distributing means comprises a first load distributing member mounted against said first side wall and a second load distributing member mounted against said second side wall, said second load distributing member being separate from said first load distributing member.

13. The aircraft brake rotor of claim 12 wherein said first load distributing member is removable from said notch independently of said second load distributing member.

14. An aircraft brake rotor comprising:
a circular rotor disk having first and second sides and a peripheral wall connecting said first and second sides, said peripheral wall including a first notch and a second notch circumferentially spaced from said first notch, each of said first and second notches having first and second side walls extending away from said bottom wall,
first and second inserts in said first notch overlying said first notch first and second side walls;
third and fourth inserts in said second notch overlying said second notch first and second side walls;
a retainer having a first U-shaped end portion near said first notch and a second U-shaped end portion near said second notch, first and second projections at said first U-shaped end portion projecting into said first notch and third and fourth projections at said second U-shaped end portion projecting into said second notch, a portion of said first insert extending between said first projection and said first notch first wall and a portion of said third insert extending between said third projection and a portion of said second notch second wall, thereby limiting movement of said first insert in a direction perpendicular to said first notch first side wall and limiting movement of said third insert in a direction perpendicular to said second notch second side wall.

15. The aircraft brake rotor of claim 14 wherein said first insert has a first portion in contact with said first notch first side and a second portion spaced from said first notch first side, said first insert second portion having a width less than a width of said first insert first portion.

16. The aircraft brake rotor of claim 15 wherein the width of said first insert second portion is less than the width of said first insert first portion.

* * * * *